United States Patent
Ito

(10) Patent No.: US 12,434,730 B2
(45) Date of Patent: Oct. 7, 2025

(54) DRIVING ASSISTANCE APPARATUS, DRIVING ASSISTANCE METHOD, AND COMPUTER-READABLE STORAGE MEDIUM STORING DRIVING ASSISTANCE PROGRAM

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 18/321,087

(22) Filed: May 22, 2023

(65) Prior Publication Data

US 2024/0051564 A1 Feb. 15, 2024

(30) Foreign Application Priority Data

Aug. 9, 2022 (JP) .................. 2022-126986

(51) Int. Cl.
*B60W 50/14* (2020.01)
*B60W 50/10* (2012.01)
(Continued)

(52) U.S. Cl.
CPC ............ *B60W 50/14* (2013.01); *B60W 50/10* (2013.01); *B60W 60/001* (2020.02); *G10L 15/22* (2013.01);
(Continued)

(58) Field of Classification Search
CPC .... B60W 50/10; B60W 50/14; B60W 60/001; B60W 2540/21; G10L 2015/221; G10L 2015/223
See application file for complete search history.

(56) References Cited

U.S. PATENT DOCUMENTS 8,355,851 B2 1/2013 Inoue et al.
8,370,040 B2 2/2013 Inoue et al.
(Continued)

FOREIGN PATENT DOCUMENTS

JP 2019-74498 A 5/2019
JP 2021-066226 A 4/2021

OTHER PUBLICATIONS

TOYOTA TConnect Service Agent, https://toyota.jp/tconnectservice/service/agent.html, 9 pages.

*Primary Examiner* — Erin D Bishop
*Assistant Examiner* — Alex B Griffin
(74) *Attorney, Agent, or Firm* — Sughrue Mion, PLLC

(57) ABSTRACT

A driving assistance apparatus executes a moving control to autonomously control a moving of a vehicle. The apparatus outputs first and second announcements and executes a voice operation process when the approval operation is performed. The first announcement is to inform a driver of contents of the voice operation process planned to be executed for the moving control in accordance with utterance contents of the driver acquired by voice recognition. The second announcement is to request the driver to perform an approval operation to approve the informed contents. The apparatus completes outputting the first announcement and execute the voice operation process, or stops outputting the first announcement, execute the voice operation process, and output a third announcement to inform the driver of the contents of the executed voice operation process when the approval operation is performed while the first announcement is output.

5 Claims, 6 Drawing Sheets

(51) Int. Cl.
    *B60W 60/00*       (2020.01)
    *G10L 15/22*       (2006.01)

(52) U.S. Cl.
    CPC ... *B60W 2540/21* (2020.02); *B60W 2540/215* (2020.02); *G10L 2015/221* (2013.01); *G10L 2015/223* (2013.01)

(56) References Cited

U.S. PATENT DOCUMENTS

| | | |
|---|---|---|
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2019/0295419 A1 | 9/2019 | Tosa et al. |
| 2021/0114584 A1* | 4/2021 | Hiratsuka .............. B60W 50/14 |

* cited by examiner

DRIVING ASSISTANCE APPARATUS, DRIVING ASSISTANCE METHOD, AND COMPUTER-READABLE STORAGE MEDIUM STORING DRIVING ASSISTANCE PROGRAM

CROSS-REFERENCE TO RELATED APPLICATIONS

This application claims priority to Japanese patent application No. JP 2022-126986 filed on Aug. 9, 2022, the content of which is hereby incorporated by reference in its entirety.

BACKGROUND

Field

The invention relates to a driving assistance apparatus, a driving assistance method, and a computer-readable storage medium storing a driving assistance program.

Description of the Related Art

There is known a driving assistance apparatus which executes a moving control to autonomously control a moving of a vehicle. The moving control may include automatic driving controls such as a constant speed control (a so-called cruise control) and a following moving control (a so-called adaptive cruise control).

As the driving assistance apparatus, there is also known the driving assistance apparatus which informs a driver of the vehicle of contents of a voice operation process planned to be executed for the moving control in accordance with contents acquired by voice recognition of utterance contents of the driver, requests the driver to perform an approval operation to approve the informed contents, and executes the voice operation process when the approval operation is performed (for example, see JP 2021-66226 A).

The driver may perform the approval operation before informing of the driver of the contents of the voice operation process, is completed. In this case, the driver may perform the approval operation without realizing the contents of the voice operation process. In this case, the contents of the voice operation process may be different from the utterance contents of the driver. Thus, if (i) informing the driver is stopped in response to the driver performing the approval operation before informing the driver of the contents of the voice operation process, is completed, and (ii) the voice operation process is executed when the contents of the voice operation process are different from the utterance contents of the driver, the driver may not be appropriately informed of the contents of the voice operation process.

SUMMARY

An object of the invention is to provide a driving assistance apparatus, a driving assistance method, and a computer-readable storage medium storing a driving assistance program which can cause the driver to realize the contents of the voice operation process when the approval operation is performed before informing the driver of the contents of the voice operation process, is completed.

A driving assistance apparatus according to the invention comprises an electronic control unit configured to execute a moving control to autonomously control a moving of a vehicle. The electronic control unit is configured to output a first announcement and a second announcement. The first announcement is an announcement to inform a driver of the vehicle of contents of a voice operation process planned to be executed for the moving control in accordance with utterance contents of the driver acquired by voice recognition. The second announcement is an announcement to request the driver to perform an approval operation to approve the informed contents. The electronic control unit is further configured to execute the voice operation process when the approval operation is performed.

The electronic control unit according to the invention is further configured to complete outputting the first announcement and execute the voice operation process when the approval operation is performed while the first announcement is output. Alternatively, the electronic control unit is further configured to stop outputting the first announcement, execute the voice operation process, and output a third announcement to inform the driver of the contents of the executed voice operation process when the approval operation is performed while the first announcement is output.

With the driving assistance apparatus according to the invention, even when the approval operation is performed while the first announcement to inform the driver of the contents of the voice operation process planned to be executed, is output, the first announcement is output to the end. Thus, the driving assistance apparatus can cause the driver to realize the contents of the voice operation process. Alternatively, with the driving assistance apparatus according to the invention, even when the approval operation is performed while the first announcement to inform the driver of the contents of the voice operation process planned to be executed, is output, the third announcement to inform the driver of the contents of the executed voice operation process is output. Thus, the driving assistance apparatus can cause the driver to realize the contents of the voice operation process.

The electronic control unit according to an aspect of the invention may be configured not to output the second announcement when the approval operation is performed while the first announcement is output.

When the approval operation is performed while the first announcement is output, the second announcement to request the driver to perform the approval operation does not need to be output. With the driving assistance apparatus according to this aspect of the invention, the second announcement is not output when the approval operation is performed while the first announcement is output. Thus, unnecessary announcement can be prevented from being output.

The electronic control unit according to another aspect of the invention may be configured to stop outputting the second announcement when the approval operation is performed while the second announcement is output.

When the approval operation is performed while the second announcement is output, the second announcement to request the driver to perform the approval operation does not need to be output. With the driving assistance apparatus according to this aspect of the invention, outputting the second announcement is stopped when the approval operation is performed while the second announcement is output. Thus, unnecessary announcement can be prevented from being output.

The electronic control unit according to further another aspect of the invention may be configured to complete outputting the first announcement and then execute the voice operation process when the approval operation is performed while the first announcement is output.

With the driving assistance apparatus according to this aspect of the invention, the first announcement is output to the end even when the approval operation is performed while the first announcement is output. Thus, the driving assistance apparatus can cause the driver to realize the contents of the voice operation process.

The electronic control unit according to further another aspect of the invention may be configured to execute the voice operation process, outputting the first announcement to the end when the approval operation is performed while the first announcement is output.

With the driving assistance apparatus according to this aspect of the invention, even when the approval operation is performed while the first announcement is output, the first announcement is output to the end. Thus, the driving assistance apparatus can cause the driver to realize the contents of the voice operation process.

A driving assistance method according to the invention is a method of executing a moving control to autonomously control a moving of a vehicle. The driving assistance method comprises a step of outputting a first announcement and a second announcement. The first announcement is an announcement to inform a driver of the vehicle of contents of a voice operation process planned to be executed for the moving control in accordance with contents acquired by voice recognition of utterance contents of the driver. The second announcement is an announcement to request the driver to perform an approval operation to approve the informed contents. The driving assistance method further comprises a step of executing the voice operation process when the approval operation is performed.

The driving assistance method according to the invention further comprises a step of completing outputting the first announcement and executing the voice operation process when the approval operation is performed while the first announcement is output. Alternatively, the driving assistance method further comprises a step of stopping outputting the first announcement, executing the voice operation process, and outputting a third announcement to inform the driver of the contents of the executed voice operation process when the approval operation is performed while the first announcement is output.

A computer-readable storage medium according to the invention is a medium which stores a driving assistance program configured to execute a moving control to autonomously control a moving of a vehicle. The driving assistance program is configured to output a first announcement and a second announcement. The first announcement is an announcement to inform a driver of the vehicle of contents of a voice operation process planned to be executed for the moving control in accordance with contents acquired by voice recognition of utterance contents of the driver. The second announcement is an announcement to request the driver to perform an approval operation to approve the informed contents. The driving assistance program is further configured to execute the voice operation process when the approval operation is performed.

The driving assistance program according to the invention is further configured to complete outputting the first announcement and execute the voice operation process when the approval operation is performed while the first announcement is output. Alternatively, the driving assistance program is further configured to stop outputting the first announcement, execute the voice operation process, and output a third announcement to inform the driver of the contents of the executed voice operation process when the approval operation is performed while the first announcement is output.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
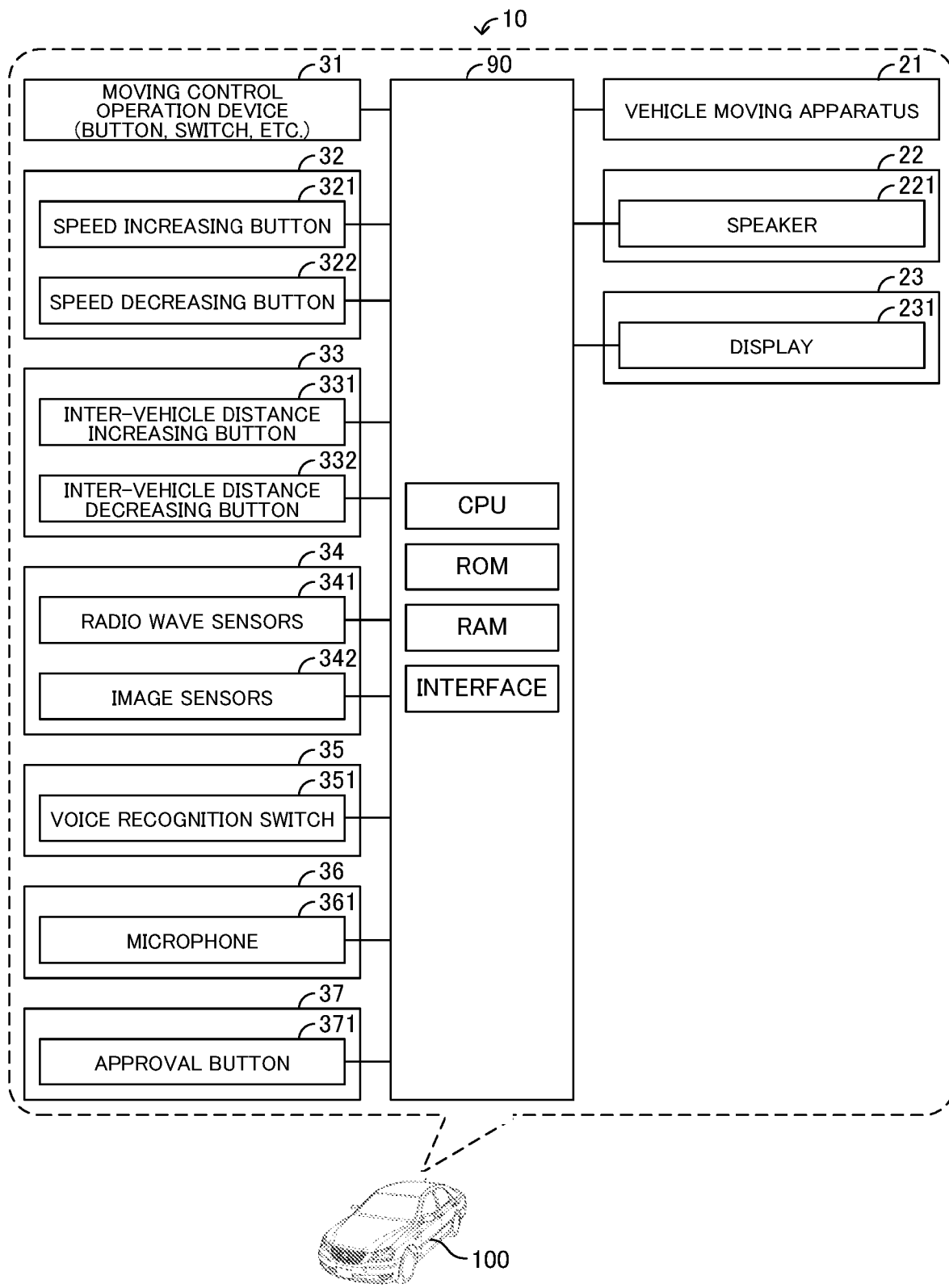
FIG. 1 is a view which shows a driving assistance apparatus according to an embodiment of the invention and a vehicle or an own vehicle installed with the driving assistance apparatus.

Below, a driving assistance apparatus, a driving assistance method, and a computer-readable storage medium storing a driving assistance program according to an embodiment of the invention will be described with reference to the drawings. As shown in FIG. 1, the driving assistance apparatus 10 according to the embodiment of the invention is installed on a vehicle or an own vehicle 100.

The driving assistance apparatus 10 includes an ECU 90, a vehicle moving apparatus 21, an informing device 22, a displaying device 23, a moving control operation device 31, a set speed setting operation device 32, an inter-vehicle distance setting operation device 33, a surrounding information detection apparatus 34, a voice recognition operation device 35, a voice acquisition device 36, and an approval operation device 37.

ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, programs, or routines stored in the ROM.

In this embodiment, the driving assistance apparatus 10 includes the single ECU 90. In this regard, the driving assistance apparatus 10 may include ECUs and be configured to realize predetermined functions by the ECUs, respectively.

The vehicle moving apparatus 21 is an apparatus which applies a driving force or a driving torque to the own vehicle 100, applies a braking force or a braking torque to the own vehicle 100, and applies a steering force or a steering torque to the own vehicle 100. The vehicle moving apparatus 21 is electrically connected to the ECU 90. The ECU 90 controls operations of the vehicle moving apparatus 21.

The informing device 22 is a device which outputs announcements. In this embodiment, the informing device 22 is a speaker 221. The speaker 221 is electrically connected to the ECU 90. The ECU 90 outputs various announcements from the speaker 221. In this embodiment, the speaker 221 is provided such that a driver of the own vehicle 100 can hear the announcements.

The displaying device 23 is a device which displays images. In this embodiment, the displaying device 23 is a display 231. The display 231 is electrically connected to the ECU 90. The ECU 90 displays various images on the display 231. In this embodiment, the display 231 is provided such that the driver of the own vehicle 100 can see the display 231.

The moving control operation device 31 is a device such as a button or a switch operated by the driver to request the ECU 90 to execute or terminate executing a moving control. The moving control operation device 31 is, for example, provided on a steering wheel of the own vehicle 100.

The moving control is a control executed for the own vehicle 100 to autonomously control a moving of the own vehicle 100. In particular, the moving control is a control to autonomously change or control a motion of the own vehicle 100. In this embodiment, the moving control includes a constant speed moving control and a following moving control. The constant speed moving control is a control to autonomously accelerate or decelerate the own vehicle 100 to maintain a moving speed V of the own vehicle 100 at a constant speed or a set speed Vset. On the other hand, the following moving control is a control to autonomously accelerate or decelerate the own vehicle 100 to maintain an inter-vehicle distance D, i.e., a distance between the own vehicle 100 and a preceding vehicle 200 at a constant distance or a target inter-vehicle distance Dtgt. In this embodiment, the inter-vehicle distance D is acquired, based on surrounding detection information IS.

The moving control operation device 31 is electrically connected to the ECU 90. When the moving control operation device 31 is operated, the moving control operation device 31 sends a signal to the ECU 90. When the ECU 90 receives the signal from the moving control operation device 31 while the moving control is not executed, the ECU 90 determines that the moving control is requested to be executed. On the other hand, when the ECU 90 receives the signal from the moving control operation device 31 while the moving control is executed, the ECU 90 determines that an execution of the moving control is requested to be terminated.

Figure 2A:
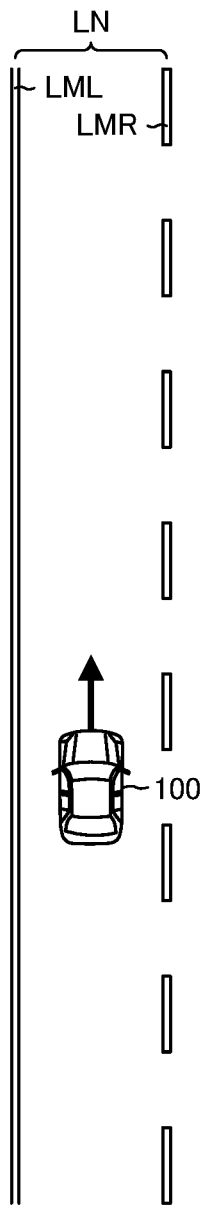
FIG. 2A is a view which shows a scene that the own vehicle is moved by a constant speed moving control.

When (i) the ECU 90 determines that the moving control is requested to be executed, (ii) a predetermined condition or a moving control precondition is satisfied, and (iii) there is no preceding vehicle 200 as shown in FIG. 2A, the ECU 90 executes the constant speed moving control. In this embodiment, the moving control precondition is a precondition for appropriately moving the own vehicle 100 by the moving control. The moving control precondition is, for example, a condition that devices such as the vehicle moving apparatus 21 and the surrounding information detection apparatus 34 normally operate. Further, in this embodiment, whether there is the preceding vehicle 200, is determined, based on the surrounding detection information IS.

Figure 2B:
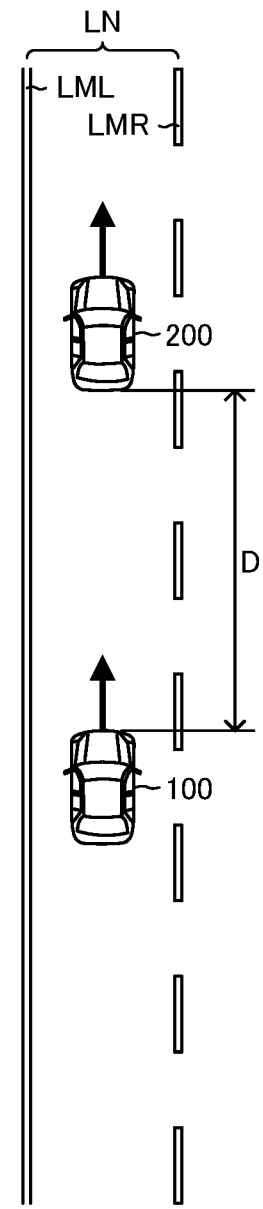
FIG. 2B is a view which shows a scene that the own vehicle is moved by a following moving control.

On the other hand, when (i) the ECU 90 determines that the moving control is requested to be executed, (ii) the predetermined condition or the moving control precondition is satisfied, and (iii) there is the preceding vehicle 200 as shown in FIG. 2B, the ECU 90 executes the following moving control. It should be noted that the preceding vehicle 200 is a vehicle moving in an own vehicle moving lane LN within a predetermined distance from the own vehicle 100 ahead of the own vehicle 100. In FIG. 2A and FIG. 2B, a reference symbol LML denotes a left lane marking which defines the own vehicle moving lane LN, and a reference symbol LMR denotes a right lane marking which defines the own vehicle moving lane LN.

The set speed setting operation device 32 is a device operated by the driver to set the set speed Vset used by the constant speed moving control. The set speed setting operation device 32 is, for example, provided on the steering wheel of the own vehicle 100. In this embodiment, the set speed setting operation device 32 includes a speed increasing button 321 and a speed decreasing button 322. The speed increasing button 321 is a device operated by the driver to increase the set speed Vset. The speed decreasing button 322 is a device operated by the driver to decrease the set speed Vset.

The speed increasing button 321 and the speed decreasing button 322 are electrically connected to the ECU 90. When the speed increasing button 321 is operated, the speed increasing button 321 sends a signal to the ECU 90. Also, when the speed decreasing button 322 is operated, the speed decreasing button 322 sends a signal to the ECU 90. When the ECU 90 receives the signal from the speed increasing button 321 while the constant speed moving control is executed, the ECU 90 increases the set speed Vset. On the other hand, when the ECU 90 receives the signal from the speed decreasing button 322 while the constant speed moving control is executed, the ECU 90 decreases the set speed Vset.

The inter-vehicle distance setting operation device 33 is a device operated by the driver to set the target inter-vehicle distance Dtgt used by the following moving control. The inter-vehicle distance setting operation device 33 is, for example, provided on the steering wheel of the own vehicle 100. In this embodiment, the inter-vehicle distance setting operation device 33 includes an inter-vehicle distance increasing button 331 and an inter-vehicle distance decreasing button 332. The inter-vehicle distance increasing button 331 is a device operated by the driver to increase the target inter-vehicle distance Dtgt. The inter-vehicle distance decreasing button 332 is a device operated by the driver to decrease the target inter-vehicle distance Dtgt.

The inter-vehicle distance increasing button 331 and the inter-vehicle distance decreasing button 332 are electrically connected to the ECU 90. When the inter-vehicle distance increasing button 331 is operated, the inter-vehicle distance increasing button 331 sends a signal to the ECU 90. Also, when the inter-vehicle distance decreasing button 332 is operated, the inter-vehicle distance decreasing button 332 sends a signal to the ECU 90. When the ECU 90 receives the signal from the inter-vehicle distance increasing button 331 while the following moving control is executed, the ECU 90 increases the target inter-vehicle distance Dtgt. On the other hand, when the ECU 90 receives the signal from the inter-vehicle distance decreasing button 332 while the following moving control is executed, the ECU 90 decreases the target inter-vehicle distance Dtgt.

The surrounding information detection apparatus 34 is an apparatus which detects information on a situation around the own vehicle 100. In this embodiment, the surrounding information detection apparatus 34 includes radio wave sensors 341 and image sensors 342. The radio wave sensor 341 is, for example, a radar sensor such as a millimeter wave radar. The image sensor 342 is, for example, a camera. It should be noted that the surrounding information detection apparatus 34 may include sound wave sensors such as ultrasonic sensors such as clearance sonars or optical sensors such as laser radars such as LiDARs.

The radio wave sensors 341 are electrically connected to the ECU 90. The radio wave sensor 341 transmits radio waves outside of the own vehicle 100 and receives reflected waves, i.e., the radio waves reflected by objects around the own vehicle 100. The radio wave sensor 341 sends detection result, i.e., information on the transmitted radio waves and the received reflected waves to the ECU 90. In other words, the radio wave sensor 341 detects objects around the own vehicle 100 and send the detection result, i.e., the information on the detected objects to the ECU 90. The ECU 90 acquires the information on the objects around the own vehicle 100 as the surrounding detection information IS, based on radio wave information, i.e., the information sent from the radio wave sensors 341. In this embodiment, the objects may be vehicles, motor cycles, bicycles, and persons.

The image sensors 342 are electrically connected to the ECU 90. The image sensor 342 takes or captures images of a view around the own vehicle 100 and sends information on the taken images (i.e., captured images or camera images) to the ECU 90. The ECU 90 acquires the information on the situation around the own vehicle 100 as the surrounding detection information IS, based on the information sent from the image sensors 342 (taken image information, captured image information, or camera image information).

The voice recognition operation device 35 is a device operated by the driver to cause the ECU 90 to execute a voice recognition process described later in detail. In this embodiment, the voice recognition operation device 35 is a voice recognition switch 351. The voice recognition switch 351 is electrically connected to the ECU 90. When the voice recognition switch 351 is operated, the voice recognition switch 351 sends a signal to the ECU 90. When the ECU 90 receives the signal sent from the voice recognition switch 351, the ECU 90 determines that the voice recognition switch 351 is operated.

The voice acquisition device 36 is a device which detects sound. In this embodiment, the voice acquisition device 36 is a microphone 361. The microphone 361 is electrically connected to the ECU 90. When the microphone 361 detects the sound, the microphone 361 sends signals corresponding to the detected sound to the ECU 90. When the ECU 90 receives the signals sent from the microphone 361, the ECU 90 acquires the sound, based on the received signals. In this embodiment, the microphone 361 is provided so as to detect voices of the driver of the own vehicle 100.

The approval operation device 37 is a device operated by the driver to approve an execution of a voice operation process, i.e., a process in accordance with contents acquired by voice recognition of utterance contents of the driver acquired through the microphone 361 as described later in detail. In this embodiment, the approval operation device 37 is an approval button 371. The approval button 371 is electrically connected to the ECU 90. When the approval button 371 is operated, the approval button 371 sends a signal to the ECU 90. When the ECU 90 receives the signal from the approval button 371 while the ECU 90 stands ready to execute the voice operation process after the ECU 90 recognizes the utterance contents by the voice recognition, the ECU 90 determines that an approval operation is performed.

It should be noted that the ECU 90 may be configured to display an approval image, i.e., an image operated by the driver to approve the execution of the voice operation process on the display 231 and determine that the approval operation is performed when a touch interaction is applied to the approval image while the ECU 90 stands ready to execute the voice operation process after the ECU 90 recognizes the utterance contents of the driver by the voice recognition.

<Summary of Operations of Driving Assistance Apparatus>

Next, a summary of operations of the driving assistance apparatus 10 will be described.

When the voice recognition switch 351 is operated while the driving assistance apparatus 10 does not execute the voice recognition process, the driving assistance apparatus 10 starts to execute the voice recognition process. On the other hand, when the voice recognition switch 351 is operated while the driving assistance apparatus 10 executes the voice recognition process, the driving assistance apparatus 10 terminates executing the voice recognition process.

The voice recognition process is a process to recognize the utterance contents of the driver of the own vehicle 100 by the voice recognition and acquire the recognized utterance contents as voice recognition contents. In this embodiment, the voice recognition process is a process to recognize the utterance contents of the driver acquired through the microphone 361 by the voice recognition and acquire the recognized utterance contents as the voice recognition contents.

While the constant speed moving control is executed, the driver can set the set speed Vset by operating the speed increasing button 321 or the speed decreasing button 322. In addition, when the voice recognition process is executed, the driver can set the set speed Vset by utterance regarding the set speed Vset.

Similarly, while the following moving control is executed, the driver can set the target inter-vehicle distance Dtgt by operating the inter-vehicle distance increasing button 331 or the inter-vehicle distance decreasing button 332. In addition, when the voice recognition process is executed, the driver can change the target inter-vehicle distance Dtgt by the utterance regarding the target inter-vehicle distance Dtgt.

When the driving assistance apparatus 10 acquires the utterance contents of the driver as the voice recognition contents while the voice recognition process is executed, the driving assistance apparatus 10 outputs a first announcement, i.e., an announcement to inform the driver of contents of a voice operation process planned to be executed for the moving control in accordance with the acquired voice recognition contents from the speaker 221.

Following the first announcement, the driving assistance apparatus 10 outputs a second announcement, i.e., an announcement to request the driver to perform the approval operation to approve the contents of the voice operation process informed by the first announcement from the speaker 221.

In this regard, the driving assistance apparatus 10 may be configured to output the first announcement and the second announcement following the first announcement as far as a vehicle motion control condition is satisfied when the driving assistance apparatus 10 recognizes the utterance contents of the driver by the voice recognition while the voice recognition process is executed. The vehicle motion control condition is a condition that the contents of the voice operation process are contents to change a motion of the own vehicle 100.

When the approval operation is performed before a predetermined time or a predetermined ready time Tw from starting outputting the second announcement from the speaker 221, elapses, the driving assistance apparatus 10 executes the voice operation process.

For example, when the driver speaks a speed which the driver desires as the set speed Vset, the driving assistance apparatus 10 outputs (i) the first announcement to inform the contents of the voice operation process planned to be executed for the moving control in accordance with the voice recognition contents, i.e., the utterance contents acquired by the voice recognition and (ii) the second announcement to request the driver to perform the approval operation. Then, the driving assistance apparatus 10 executes the voice operation process, i.e., the process to set the speed which the driver speaks to the set speed Vset when the approval operation is performed before the predetermined ready time Tw elapses.

Alternatively, when the driver speaks a distance which the driver desires as the target inter-vehicle distance Dtgt, the driving assistance apparatus 10 outputs (i) the first announcement to inform the contents of the voice operation process planned to be executed for the moving control in accordance with the voice recognition contents, i.e., the utterance contents acquired by the voice recognition and (ii) the second announcement to request the driver to perform the approval operation. Then, the driving assistance apparatus 10 executes the voice operation process, i.e., the process to set the distance which the driver speaks to the target inter-vehicle distance Dtgt when the approval operation is performed before the predetermined ready time Tw elapses.

In this regard, when the approval operation is not performed before the predetermined ready time Tw elapses, that is, when the predetermined ready time Tw elapses without performing the approval operation, the driving assistance apparatus 10 outputs an announcement to inform that the voice operation process is not executed from the speaker 221. In this case, the driving assistance apparatus 10 does not execute the voice operation process.

The approval operation may be performed before the driving assistance apparatus 10 completes outputting the first announcement from the speaker 221. In this case, the driver may perform the approval operation without realizing the contents of the voice operation process. In this case, when the contents of the voice operation process are different from the utterance contents of the driver, the voice operation process of the contents different from the process of the contents which the driver desires, is adversely executed.

Accordingly, when the approval operation is performed before the driving assistance apparatus 10 completes outputting the first announcement from the speaker 221, that is, when the approval operation is performed while the first announcement is output, the driving assistance apparatus 10 completes outputting the first announcement without stopping outputting the first announcement and executes the voice operation process. In particular, in this embodiment, when the approval operation is performed while the first announcement is output, the driving assistance apparatus 10 executes the voice operation process after the driving assistance apparatus 10 completes outputting the first announcement without stopping outputting the first announcement. Alternatively, when the approval operation is performed while the first announcement is output, the driving assistance apparatus 10 executes the voice operation process, outputting the first announcement and completes outputting the first announcement. In this case, the driving assistance apparatus 10 does not output the second announcement.

Further, when the approval operation is performed before the driving assistance apparatus 10 completes outputting the second announcement from the speaker 221, that is, when the approval operation is performed while the second announcement is output, the driving assistance apparatus 10 stops outputting the second announcement and executes the voice operation process.

Thereby, the first announcement is output to the end even when the approval operation is performed while the first announcement is output. Thus, the driving assistance apparatus 10 can cause the driver to realize the contents of the voice operation process.

It should be noted that the invention is not limited to the aforementioned embodiments, and various modifications can be employed within the scope of the invention.

For example, the driving assistance apparatus 10 may be configured to stop outputting the first announcement and execute the voice operation process, and output a third announcement, i.e., an announcement to inform the driver of the contents of the executed voice operation process when the approval operation is performed while the first announcement is output.

Thereby, when the approval operation is performed while the first announcement is output, outputting the first announcement is stopped, but the third announcement to inform the driver of the contents of the executed voice operation process is output. Thus, the driving assistance apparatus 10 can cause the driver to realize the contents of the voice operation process.

<Specific Operations of Driving Assistance Apparatus>

Figure 3:
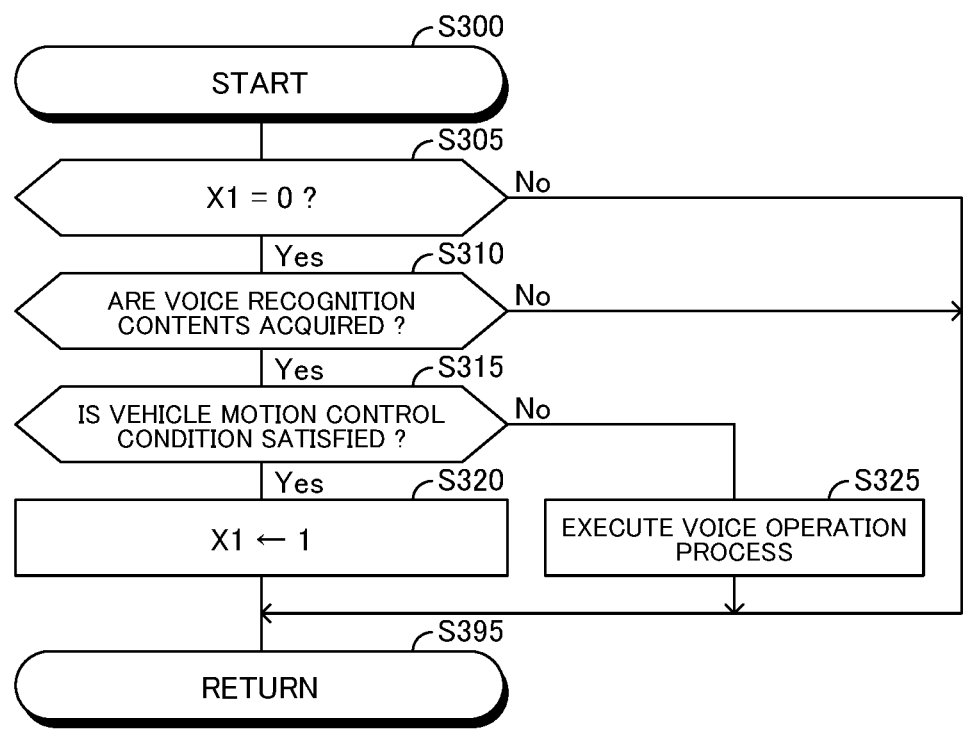
FIG. 3 is a view which shows a flowchart of a routine executed by the driving assistance control according to the embodiment of the invention.

Next, specific operations of the driving assistance apparatus 10 will be described. The CPU of the ECU 90 of the driving assistance apparatus 10 is configured or programmed to execute a routing shown in FIG. 3 while the voice recognition process is executed with a predetermined calculation cycle. Thus, at a predetermined timing, the CPU starts a process from a step S300 of the routine shown in FIG. 3 and proceeds with the process to a step S305 to determine whether a value of a processing flag X1 is "0."

When the CPU determines "Yes" at the step S305, the CPU proceeds with the process to a step S310 to determines whether the voice recognition contents are acquired by the voice recognition of the utterance contents of the driver.

When the CPU determines "Yes" at the step S310, the CPU proceeds with the process to a step S315 to determine whether the vehicle motion control condition is satisfied.

When the CPU determines "Yes" at the step S315, the CPU proceeds with the process to a step S320 to set the value of the processing flag X1 to "1." Then, the CPU proceeds with the process to a step S395 to terminate executing this routine once.

On the other hand, when the CPU determines "No" at the step S315, the CPU proceeds with the process to a step S325 to execute the voice operation process. Then, the CPU proceeds with the process to the step S395 to terminate executing this routine once.

Further, when the CPU determines "No" at the step S305 or the step S310, the CPU proceeds with the process directly to the step S395 to terminate executing this routine once.

Figure 4:
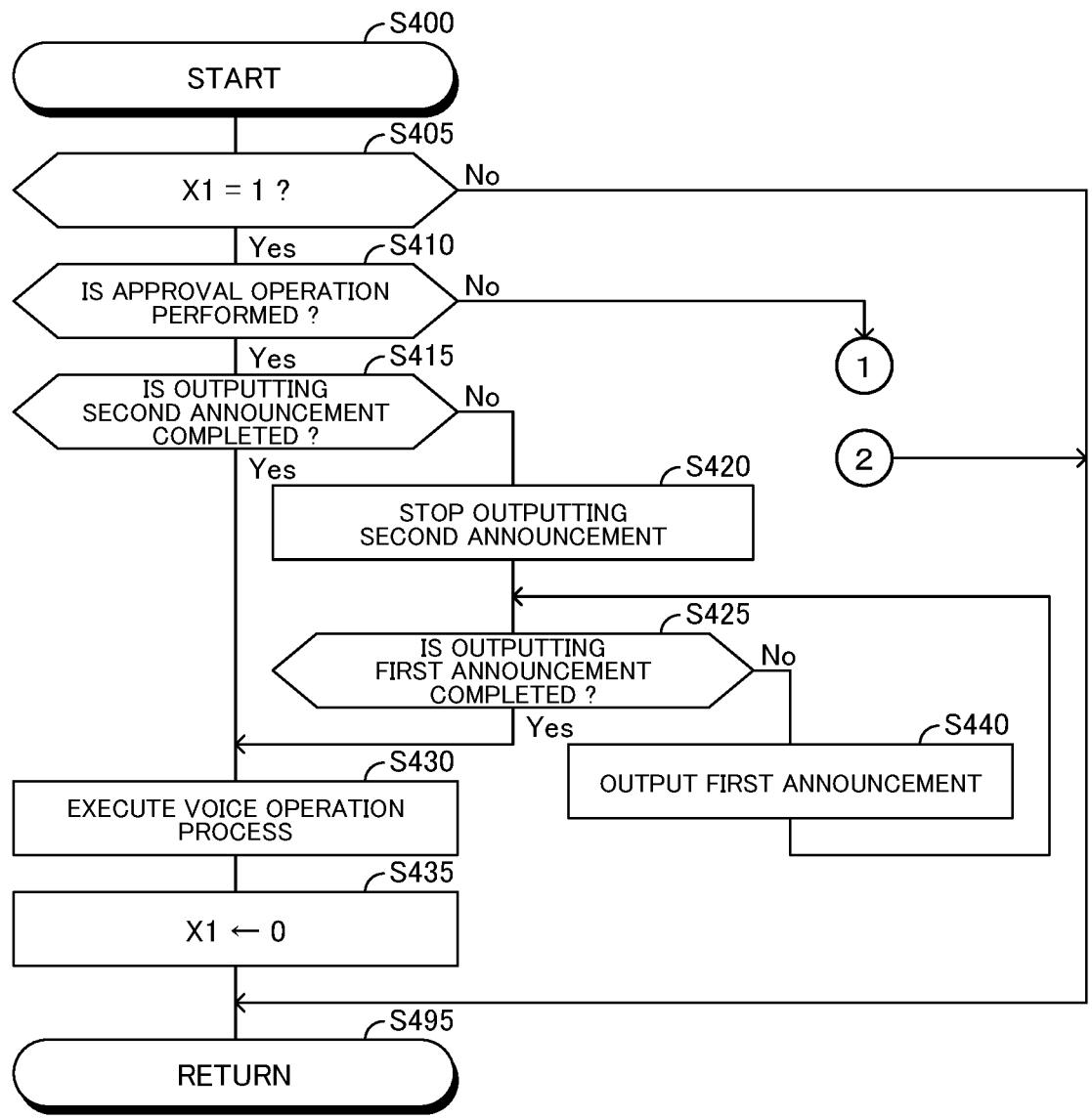
FIG. 4 is a view which shows a flowchart of a routine executed by the driving assistance control according to the embodiment of the invention.

In addition, the CPU is configured or programmed to execute a routine shown in FIG. 4 with the predetermined calculation cycle while the voice recognition process is executed. Thus, at a predetermined timing, the CPU starts a process from a step S400 of the routine shown in FIG. 4 and proceeds with the process to a step S405 to determine whether the value of the processing flag X1 is "1."

When the CPU determines "Yes" at the step S405, the CPU proceeds with the process to a step S410 to determine whether the approval operation is performed.

When the CPU determines "Yes" at the step S410, the CPU proceeds with the process to a step S415 to determine whether outputting the second announcement is completed.

When the CPU determines "Yes" at the step S415, the CPU proceeds with the process to a step S430 to execute the voice operation process. Then, the CPU proceeds with the process to a step S435 to set the value of the processing flag X1 to "0." Then, the CPU proceeds with the process to a step S495 to terminate executing this routine once.

On the other hand, when the CPU determines "No" at the step S415, the CPU proceeds with the process to a step S420 to stop outputting the second announcement from the speaker 221. Then, the CPU proceeds with the process to a step S425 to determine whether outputting the first announcement is completed.

When the CPU determines "Yes" at the step S425, the CPU proceeds with the process to a step S430 to execute the voice operation process. Then, the CPU proceeds with the process to a step S435 to set the value of the processing flag X1 to "0." Then, the CPU proceeds with the process to the step S495 to terminate executing this routine once.

On the other hand, when the CPU determines "No" at the step S425, the CPU proceeds with the process to a step S440 to continue outputting the first announcement from the speaker 221. Then, the CPU proceeds with the process to a step S425 to determine whether outputting the first announcement is completed.

Figure 5:
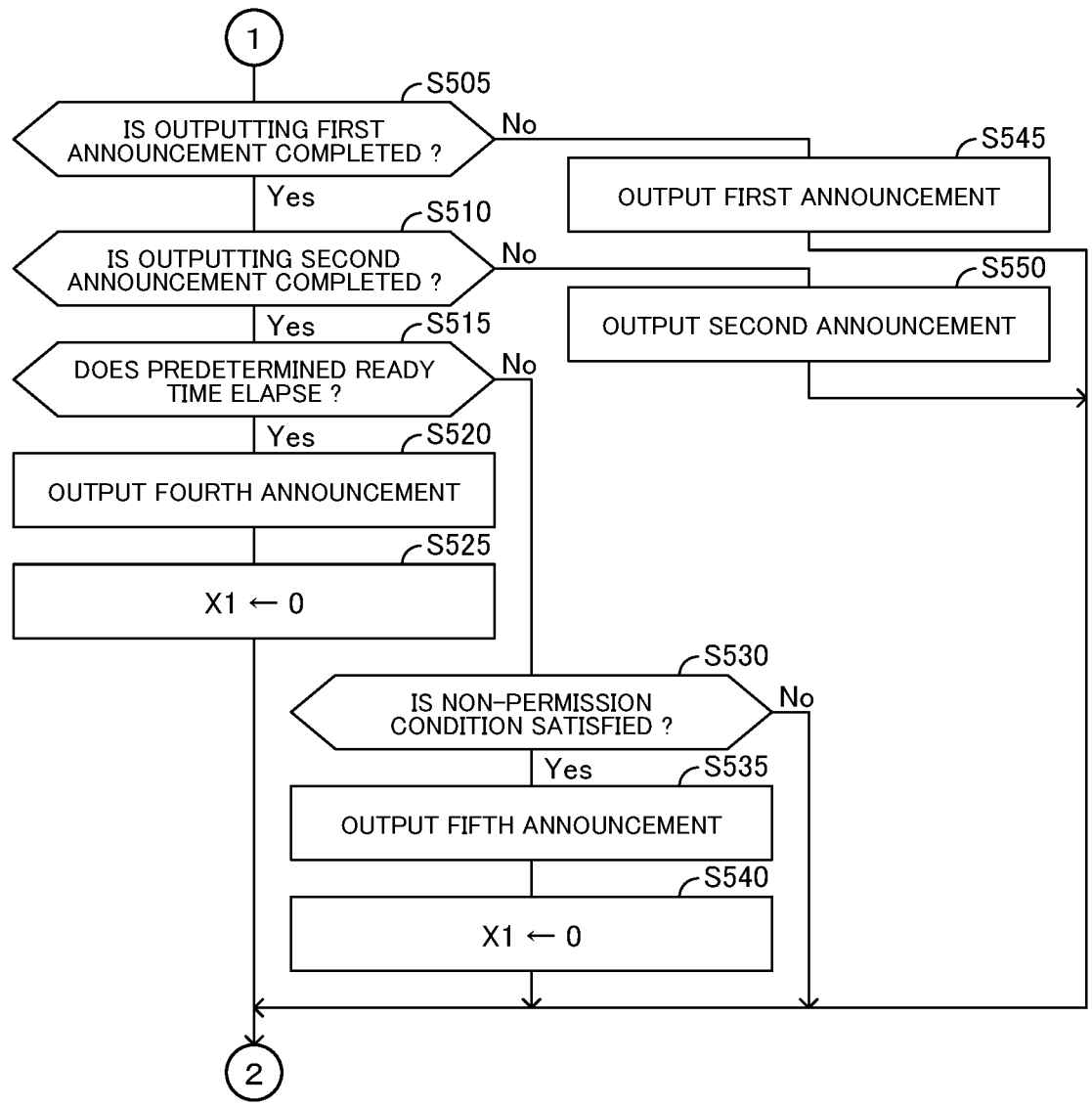
FIG. 5 is a view which shows a flowchart of a routine executed by the driving assistance control according to the embodiment of the invention.

Further, when the CPU determines "No" at the step S410, the CPU proceeds with the process to a step S505 of a routine shown in FIG. 5 to determine whether outputting the first announcement is completed.

When the CPU determines "Yes" at the step S505, the CPU proceeds with the process to a step S510 to determine whether outputting the second announcement is completed.

When the CPU determines "Yes" at the step S510, the CPU proceeds with the process to a step S515 to determine whether the predetermined ready time Tw elapses since outputting the second announcement is completed.

When the CPU determines "Yes" at the step S515, the CPU proceeds with the process to a step S520 to output a fourth announcement from the speaker 221. The fourth announcement is an announcement to inform that the voice operation process is not executed. In this regard, the fourth announcement may include an announcement to inform a reason for not executing the voice operation process. Then, the CPU proceeds with the process to a step S525 to set the value of the processing flag X1 to "0." Then, the CPU proceeds with the process to the step S495 of the routine shown in FIG. 4 to terminate executing this routine once.

On the other hand, when the CPU determines "No" at the step S515, the CPU proceeds with the process to a step S530 to determine whether a non-permission condition is satisfied. The non-permission condition is a condition that a moving situation of the vehicle, i.e., a situation relating to the moving of the own vehicle 100 corresponds to a predetermined situation where the driving assistance apparatus 10 determines that the execution of the voice operation process cannot be permitted. For example, the non-permission condition is a condition that the set speed Vset set by the voice operation process exceeds a speed limit to be applied to the own vehicle 100 when the voice operation process is a process to set or change the set speed Vset.

When the CPU determines "Yes" at the step S530, the CPU proceeds with the process to a step S535 to output a fifth announcement from the speaker 221. The fifth announcement is an announcement to inform that the execution of the voice operation process is not permitted. In this regard, the fifth announcement may include an announcement to inform a reason for not executing the voice operation process. Then, the CPU proceeds with the process to a step S540 to set the value of the processing flag X1 to "0." Then, the CPU proceeds with the process to the step S495 of the routine shown in FIG. 4 to terminate executing this routine once.

On the other hand, when the CPU determines "No" at the step S530, the CPU proceeds with the process directly to the step S495 of the routine shown in FIG. 4 to terminate executing this routine once.

Further, when the CPU determines "No" at the step S505, the CPU proceeds with the process to a step S545 to output or continue outputting the first announcement from the speaker 221. Then, the CPU proceeds with the process to the step S495 of the routine shown in FIG. 4 to terminate executing this routine once.

Further, when the CPU determines "No" at the step S510, the CPU proceeds with the process to a step S550 to output or continue outputting the second announcement from the speaker 221. Then, the CPU proceeds with the process to the step S495 of the routine shown in FIG. 4 to terminate executing this routine once.

Figure 6:
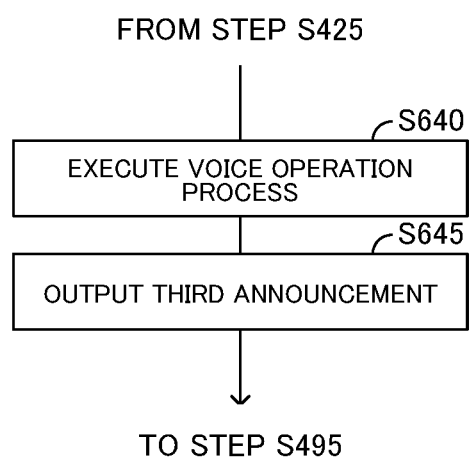
FIG. 6 is a view which shows a flowchart of a routine executed by the driving assistance control according to the embodiment of the invention.

It should be noted that the CPU may be configured or programmed to execute a step S640 and a step S645 shown in FIG. 6 in place of the step S440 of the routine shown in FIG. 4. In this case, when the CPU determines "No" at the step S425 of the routine shown in FIG. 4, the CPU proceeds with the process to the step S640 to execute the voice operation process. Then, the CPU proceeds with the process to the step S645 to output the third announcement to inform the contents of the voice operation process executed at the step S640 from the speaker 221. Then, the CPU proceeds with the process to the step S495 of the routine shown in FIG. 4 to terminate executing this routine once.

The specific operations of the driving assistance apparatus 10 have been described.

What is claimed is:

1. A driving assistance apparatus, comprising:
an electronic control unit configured to execute a moving control to autonomously control a moving of a vehicle, the electronic control unit being configured to:
output a first announcement and a second announcement,
the first announcement being an announcement to inform a driver of the vehicle of contents of a voice operation process planned to be executed for the moving control in accordance with utterance contents of the driver acquired by voice recognition, and
the second announcement being an announcement to request the driver to perform an approval operation to approve the informed contents; and
execute the voice operation process when the approval operation is performed,
wherein the electronic control unit is configured to:
complete outputting the first announcement and execute the voice operation process in response to the approval operation being performed before completing the output of the first announcement.

2. The driving assistance apparatus as set forth in claim 1, wherein the electronic control unit is configured to not output the second announcement when the approval operation is being performed before completing the output of the first announcement.

3. The driving assistance apparatus as set forth in claim 1, wherein the electronic control unit is configured to stop outputting the second announcement when the approval operation is performed while the second announcement is output.

4. A driving assistance method of executing a moving control to autonomously control a moving of a vehicle, the driving assistance method comprising steps of:
   outputting a first announcement and a second announcement,
      the first announcement being an announcement to inform a driver of the vehicle of contents of a voice operation process planned to be executed for the moving control in accordance with contents acquired by voice recognition of utterance contents of the driver, and
      the second announcement being an announcement to request the driver to perform an approval operation to approve the informed contents; and
   executing the voice operation process when the approval operation is performed;
   wherein the driving assistance method comprises a step of:
      completing outputting the first announcement and executing the voice operation process in response to the approval operation being performed before completing the output of the first announcement.

5. A non-transitory computer-readable storage medium storing a driving assistance program configured to execute a moving control to autonomously control a moving of a vehicle,
   the driving assistance program being configured to:
      output a first announcement and a second announcement,
         the first announcement being an announcement to inform a driver of the vehicle of contents of a voice operation process planned to be executed for the moving control in accordance with contents acquired by voice recognition of utterance contents of the driver, and
         the second announcement being an announcement to request the driver to perform an approval operation to approve the informed contents; and
      execute the voice operation process when the approval operation is performed; and
   wherein the driving assistance program is configured to:
      complete outputting the first announcement and execute the voice operation process in response to the approval operation being performed before completing the output of the first announcement.

* * * * *